United States Patent [19]
Dupre

[11] 3,959,142
[45] May 25, 1976

[54] MANHOLE AERATOR

[76] Inventor: Herman K. Dupre, c/o Seven Springs, Champion, Pa. 15622

[22] Filed: Feb. 8, 1973

[21] Appl. No.: 330,631

[52] U.S. Cl. .............................. 210/170; 261/112; 261/119 R
[51] Int. Cl.² ......................................... E02B 15/04
[58] Field of Search .............. 210/170, 26, 15, 199, 210/220, 247, 532, 532 S; 404/25, 26, 2, 5; 261/119, 112

[56] References Cited
UNITED STATES PATENTS

| 727,446 | 5/1903 | Richert | 210/532 |
|---|---|---|---|
| 3,317,197 | 5/1967 | Lohner et al. | 261/112 X |
| 3,353,676 | 11/1967 | Hirsch | 210/199 X |
| 3,525,685 | 8/1970 | Edwards | 210/170 X |
| 3,731,812 | 5/1973 | Stone | 210/220 |
| 3,734,850 | 5/1973 | Karr | 210/220 X |

OTHER PUBLICATIONS

Josam Mfg. Co. Catalog M, 1965, Michigan City, Indiana, pp. 137–139.

Primary Examiner—Theodore A. Granger
Attorney, Agent, or Firm—Carothers and Carothers

[57] ABSTRACT

A manhole aerator including a conventional manhole having a sewer inlet and outlet line with a vented manhole cover wherein the inlet line is provided with upwardly extended pipe elbow section centrally aligned within the manhole with an upwardly open end to permit an overflow discharge of sewage into the manhole. An annular baffle is secured to the open end to deflect the sewage flow to fall and splash against the bottom of the manhole. A gate valve may be provided in a straight pipe extension from the elbow section to permit periodic self cleaning of the elbow section, if necessary.

6 Claims, 3 Drawing Figures

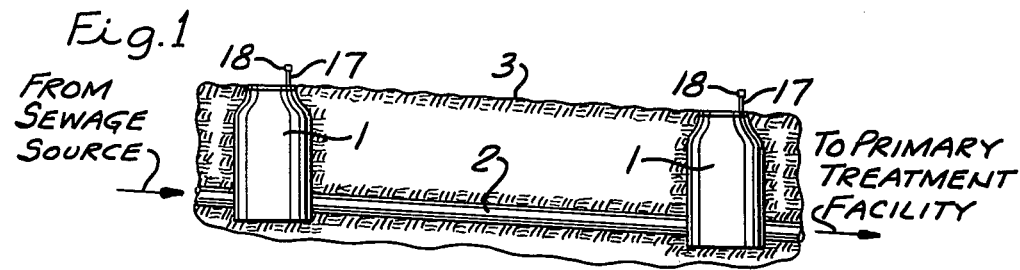
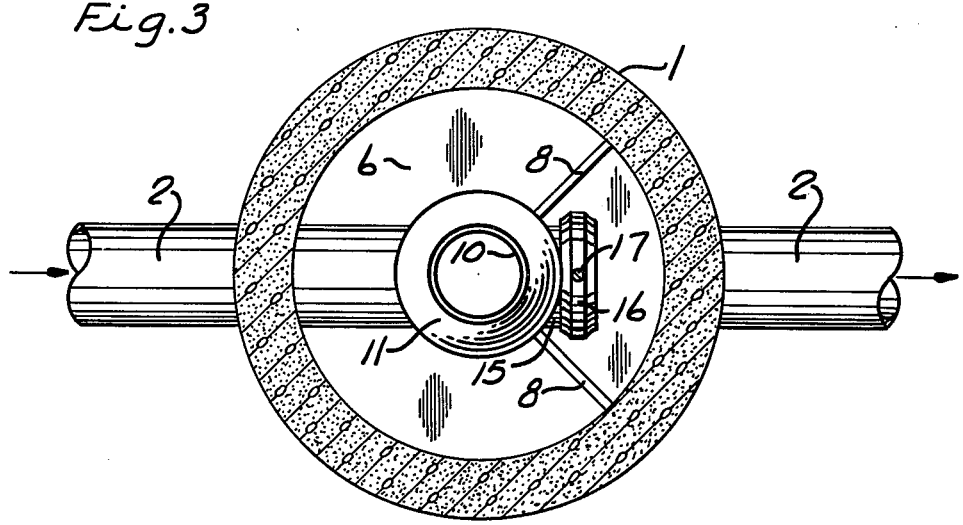
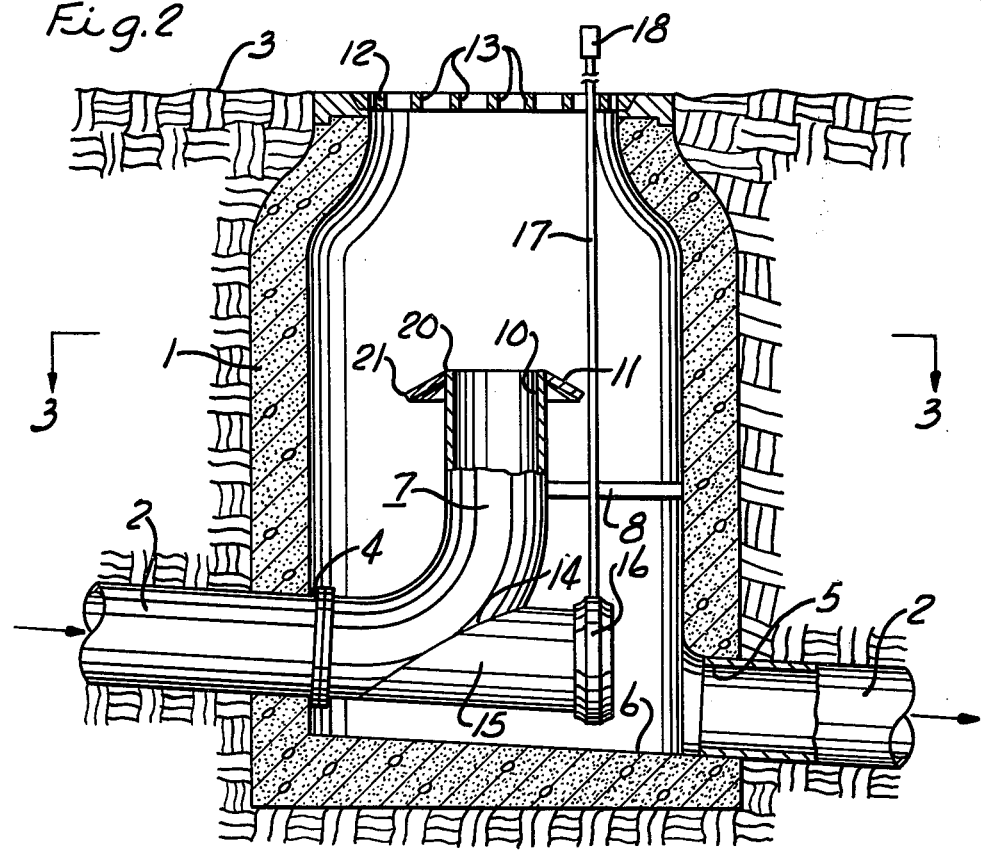

MANHOLE AERATOR

BACKGROUND OF INVENTION

It is unquestionably old in the art to provide means for forcing air because of its oxygen content into a vessel in which sewage or other such waste is passed through or treated to reduce the natural affinity toward oxygen found in sewage. This affinity is usually expressed as the biological oxygen demand (B.O.D.) in terms of parts per million of oxygen necessary to render the sewage nonseptic or innocuous to natural life, such as plant or fish life. Typical sewage may have about 100 to about 300 parts per million. Health departments usually require that this be reduced below 30 parts per million before the treated sewage is deposited in lakes or streams.

Typical aerators for this purpose are shown in U.S. Pat. Nos. . No. 3,149,071 (210–197) and 3,662,890 (210–195). Both these patents disclose waste treatment facilities wherein the BOD of the sewage liquid is reduced by pumping air directly into the sewage.

On the other hand, others, such as U.S. Pat. No. 1,963,354 (210–26), have suggested pumping air into an existing sewer line by providing a tank or manhole in the sewer line without interfering with the sewer line per se. U.S. Pat. No. 3,525,685 (210–15) provides an air line within the sewage line running from the point of collection to the point of treatment for supplying air into the moving sewage to prevent it from becoming septic and from building up undesirable sulfides, sulfates, methane gases and sulfuric acid, which can eventually destroy sewage lines. By forcing air into the moving sewage, stimulation of desirable aerobic bacteria growth is accomplished.

Rather than forcing air into moving sewage, U.S. Pat. No. 3,335,082 (210–15) suggests the drawing of air from a manhole through the sewage line to bring the sewage liquid into intimate contact with the air as well as remove obnoxious odors and gases from the sewer line.

Thus, the prior art recognizes the desirability of providing some aerating treatment within the sewage line between the source of the sewage and the treatment facility to not only control the build up of harmful and obnoxious gases, such as hydrogen sulphide and methane, as well as the formation of sulfates and sulfuric acid, but also to provide for secondary biological treatment by stimulating aerobic bacteria growth within the sewage as it is moving toward the primary treatment facility. This type of secondary treatment increases the capacity of the primary treatment facility by reducing the BOD in the sewage prior to its reaching the primary facility.

The present invention is directed to such a secondary "in-line" treatment apparatus to be provided in existing or newly built manholes in sewage lines between the source of the sewage and the primary treatment facility. The aerator apparatus of the present invention provides an inexpensive and simple structural means to cause the sewage to be placed in intimate and overall direct contact with air through the employment of an upstanding pipe end positioned centrally of the manhole to cause the gravity fed sewage to be directed upwardly within the manhole in the form of a fountain and flowed over the top of the conical ring and then splashed against the bottom of the manhole and thereafter drain down through an outlet where it is directed back into the sewage line. The secondary treatment apparatus suggested by U.S. Pat. Nos. 3,525,685 and 3,484,836 is costly, respectively requiring an air pump with a pipe line within the sewer line and a motor driven rotating disk member. While the structure of the present invention is intended to provide the same biological advantages desired in such secondary treatment, the present structure is much less expensive and has no moving parts which require maintenance and replacement, particularly those parts in direct contact with the sewage. Further, the structure herein disclosed has been found to be quite effective in reducing the BOD as compared to such secondary treatment facilities of the prior art since the sewage is caused to be forced upwardly within the manhole and splashed and sprayed about causing much more of the sewage liquid to be in overall direct contact with air than that provided by the structures shown in the above-mentioned two Patents.

U.S. Pat. No. 848,279 (210–150) does show the employment of an upwardly extended discharge pipe in a sewage treatment tank which is connected to relatively pure water supply, such as rain water, to direct the water upwardly in the tank to periodically cause decomposition of the mat formed on the top of the sewage and cause renewal of the aerobic bacteria growth in the tank by letting the air again be in intimate contact with the sewage liquid in the tank.

SUMMARY OF THE INVENTION

The principal object of this invention is the provision of a manhole aerator provided as secondary treatment in a manhole connected in a sewer or other such waste line between the source or origin of the sewage and the primary treatment facility to decrease the BOD of the sewage prior to its reaching the primary facility thereby increasing the organic load capacity of the latter while, at the same time, controlling the septic formation of undesirable elements and gases harmful and obnoxious to man and his environment, such as, plant and fish life, as well as destructive to concrete sewage systems.

Another principal object of the present invention is a manhole aerator having no moving parts which, in general, comprises manhole inlet means in the form of an upwardly extended pipe end located centrally in the manhole with a baffle member in the form of a conical shaped fin provided on the pipe end to permit the sewage to flow into the manhole by the force of gravity and fall from the edge of the baffle member directly to the bottom of the manhole thereby bringing the sewage through overall contact with air, the air being free to enter the manhole through a manhole cover having a plurality of ventilating apertures. The falling liquid sewage forms a waterfall over the baffle member developing air shredding in its fall to the bottom of the manhole. By air shredding, it is meant that the frictional contact of the falling liquid with the air causes the liquid to break up into smaller liquid streams and particles.

Another object of the present invention is the provision of a gate valve provided in a pipe extension in line with the sewage inlet line to provide for periodic opening of the pipe inlet because of sewage clogging to permit the sewage to be directed immediately to the discharge or outlet and permit the sewer to self-dislodge the clogged material.

Another object of this invention is the provision of manhole aerator having no moving parts and capable of reducing the BOD by as much as 5% to 13%, depending upon the volume, pressure and BOD level of the influent. The decreasing of the BOD prior to the primary treatment facility has been found to increase the treating capacity of the plant by reducing the organic load imposed upon the facility. Thus, the liquid sewage will flow over the annular baffle and drop against the manhole bottom with interim air shredding, all of which brings about the occurrence of aeration.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a side elevational view of a portion of a sewage pipe line beneath ground level between the sewage source and the primary treatment facility.

FIG. 2 is a cross-sectional view of the manhole aerator comprising this invention beneath ground level.

FIG. 3 is a cross-sectional view taken along the line 3—3 of FIG. 2.

DETAILED DESCRIPTION OF PREFERRED EMBODIMENT

Reference is now made to FIG. 1 wherein there is shown the typical sanitary sewer transporting means comprising the manhole 1 for access to the sanitary sewer line 2 buried beneath the ground level 3. Sewage moves through the sewer line 2 by means of gravity flow from the sewage source to the primary treating facility.

This invention contemplates the modification of existing manholes 1 as shown in FIG. 1 or the construction of the aerator as disclosed and claimed herein in sewer transporting means in the process of construction.

As shown in FIGS. 2 and 3, particularly FIG. 2, the manhole 1 is provided to have sewer line 2 interrupted so as to provide an inlet 4 and an outlet 5 positioned near the bottom 6 of the manhole 1. Connected to the inlet 4 is the upwardly extended elbow pipe section 7 supported centrally within the cylindrical confines of manhole 1 by means of the support braces 8. The upwardly extended elbow section 7, as such, provides for the sewage from the sewage source to enter the manhole at the outlet 10 so as to be discharged into the interior of the manhole 1. Also provided on the outlet 10 of the elbow section 7 is the baffle member 11 which is secured to the edge of the outlet 10. The baffle member 11 is conical in shape and aids in directing the sewage proceding from outlet 10 to be deflected and dispersed within the interior of the manhole 1 and against the bottom. The sewage then proceeds out the outlet 5 of the sewer line 2.

It can be seen from the foregoing description that the sewage proceding from the outlet 10 will be diffused and splashed on the bottom of the manhole 1 and, as such, placed in intimate contact with air which can freely enter the manhole 1 through the manhole cover 12 by means of the plurality of vent openings 13.

It is preferred that the elbow section 7 extend as high as possible toward the top of manhole 1. However, the extent of the height is determined by the volume and pressure of the sewage flow in sewer line 2. The outlet 10 of the elbow section 7 should not be so high that the top of the fountain produced by the outward flow would extend through the vents 13 in manhole cover 12. However, the outlet 10 should be high enough to obtain maximum vertical drop of the sewage to obtain maximum air shredding as well as turbulent splashing at the manhole bottom.

The baffle member 11 is secured at its high point 20 to the edge of the outlet 10 so that the liquid sewage will flow over the baffle surface and drop from its lower edge 21. It is preferable that the angular extent of the baffle member 11 relative to the longitudinal axis of outlet 10 be of wide angular extent, as shown, so that the liquid will fall from the edge 21. However, edge 21 must be of sufficient distance below the top edge 20 to provide for good liquid run off from outlet 10. The principal concept is to direct the liquid away from the sides of the elbow section 7 so that the liquid will not run down the elbow section sides or under the baffle member and at the same time provide for a good waterfall drop from edge 21 to achieve maximum air shredding.

It should be noted that if there is more than one manhole aerator in a sewer line system as depicted in FIG. 1, the top edge 20 of the elbow section of the lower positioned manhole should not be higher in elevation than the bottom of the upper positioned manhole to insure no interference with the natural flow of the sewage through the system.

At the elbow portion 14 of the elbow pipe section 7, there is provided the straight pipe section 15 to which is attached the gate valve 16. Gate valve 16 is operated by means of the upwardly extended rod 17 and handle 18. Gate valve 16 together with straight pipe section 15 are provided to be periodically opened, if necessary, to dislodge any clogging in the sewer 2, particularly at the inlet 4 or within the elbow pipe section 7. Experience has indicated, however, that such clogging is quite infrequent. If such clogging should occur at these points, the opening of gate valve 16 permits, by gravity flow and force, the sewage to flow through straight pipe section 15 directly to the outlet 5 of manhole 1, the pressure of which is sufficient to break up any clogging formation that may have developed within the elbow pipe section 7 or elsewhere in "uphill" line 2 toward the sewage source.

The gate valve 16 is of the conventional type and need not be a tight fitting gate valve, as a small percentage of leakage around the gate valve will not interfere with the utility of the elbow pipe section 7.

From the foregoing description, it can be readily seen the advantages of the manhole aerator comprising this invention as a secondary treatment facility wherein the sewage being transported to the primary treatment facility can be aerated in a very positive manner due to the wide dispersion of the sewage within the manhole 1 thereby preventing the sewage from becoming septic as well as preventing the formation of undesirable elements such as hydrogen sulfide and methane gases. In particular, such a secondary aeration treatment prevents the formation of sulfates and sulfides which when mixed, particularly with water condensate, may form sulfuric acid and cause destructive damage to the concrete principally used in the construction of sanitary sewer systems.

By the same token, it has been found that the employment of the manhole aerator comprising this invention substantially does away with obnoxious odors present in sewage upon entering the open air primary treatment facility.

However, the most important aspect of the manhole aerator is the simplicity of design incorporating no moving parts in need of maintenance and replacement and at the same time reducing the organic load placed upon the primary treatment facility by reducing the B.O.D. entering the primary treatment facility by as much as 6 to 13% per manhole when employing the structure comprising this invention.

I claim:

1. A manhole aerator including a vented manhole having a sewer inlet line and a sewer outlet line and wherein the improvement comprises an upwardly extended pipe section substantially centrally aligned within said manhole and secured to said inlet line and having an upwardly open end for the discharge of the sewage within said manhole, and an annular baffle member secured to said open end and adapted to annularly and outwardly diffuse the sewage flow thereabout and allow it to free fall to the bottom of said manhole.

2. The manhole aerator of claim 1 characterized by a downwardly disposed conical-shaped baffle comprising said baffle member.

3. The manhole aerator of claim 2 characterized by means to support said pipe section in its upwardly extended position.

4. A manhole aerator including a manhole vented to permit the entrance of air therein and having a sewage inlet and outlet line thereto with the sewage outlet at the bottom of the manhole wherein the improvement comprises an upwardly extended elbow pipe section substantially centrally aligned within said manhole and secured to said inlet line and having an upwardly open end for the discharge of the sewage influent within said manhole, an annular baffle member secured to said open end and adapted to annularly and outwardly diffuse the sewage flow and allow it to free fall to the bottom of said manhole, a straight pipe section secured to said elbow section to be substantially aligned with said sewage inlet line and a gate valve closing said straight section.

5. The manhole aerator of claim 4 characterized by means extending through said manhole cover to open and close said gate valve.

6. A manhole aerator included within a vented manhole having a sewer inlet and a sewer outlet, said aerator characterized by manhole inlet means extending upwardly in and substantially centrally within said manhole and having an upwardly open discharge end to permit the discharge of sewage therein in the form of a fountain and an annular baffle member secured to said discharge end to diffuse the sewage flow and allow it to free fall to the bottom of said manhole.

* * * * *